Patented Feb. 11, 1941

2,231,756

UNITED STATES PATENT OFFICE 2,231,756

PROCESS FOR RESOLVING PETROLEUM EMULSIONS

Melvin De Groote, University City, and Bernhard Keiser, and Charles M. Blair, Jr., Webster Groves, Mo., assignors to Petrolite Corporation, Ltd., Wilmington, Del., a corporation of Delaware No Drawing. Application July 13, 1939, Serial No. 284,380

4 Claims. (Cl. 252—341)

This invention relates primarily to the treatment of emulsions of mineral oil and water, such as petroleum emulsions, for the purpose of separating the oil from the water.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion, our process being particularly adapted for the resolution of crude oil emulsions of the kind obtained in connection with the treatment or the flooding of subterranean oil-bearing strata by means of aqueous agents or the like.

Another object of our invention is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

The process which constitutes our present invention consists in subjecting a petroleum emulsion of the water-in-oil type to the action of a demulsifying agent, thereby causing the emulsion to break and separate into its component parts of oil and water or brine when it is permitted to remain in a quiescent state, after treatment, or is subjected to other equivalent separatory procedure.

The demulsifying agent employed in the present process consists of or comprises a chemical compound obtained by esterification of a hydroxy amino-ether with a polybasic carboxy acid body of the kind in which a detergent-forming acid radical constitutes part of the molecule. Such polybasic carboxy acid compounds containing detergent-forming acid radicals will be subsequently described in detail. The hydroxy amino-ether is characterized by the fact that it is free from any acyl radicals derived from acids containing more than 7 carbon atoms.

Monocarboxy detergent-forming acids are characterized by having at least 8 carbon atoms and not more than 32 carbon atoms, and are exemplified by fatty acids, naphthenic acids, abietic acids, or the like, or by simple modifications thereof, which do not detract from the ability of the acid to combine with alkali to produce soap or soap-like materials. For instance, hydrogenated oleic acid, chlorinated naphthenic acid, or brominated abietic acid will form such detergent-like bodies with the same ease as the parent materials themselves. The oxidized acids obtained by blowing or oxidation of the acids or esters are satisfactory. Such acids have frequently been referred to collectively in the art as monocarboxy detergent-forming acids.

The reaction between a polybasic carboxy acid of the kind hereinafter described is dependent upon such polybasic carboxy acid having at least one uncombined carboxyl radical and is dependent upon the amino-ether containing at least one alcoholiform hydroxyl radical. Such amino-ether may be acylated with an acid containing less than 8 carbon atoms, for instance, an acid such as acetic acid, butyric acid, heptoic acid, or the like. Such acylation can be conducted in the conventional manner by means of the acid, or it may be conducted by means of a compound of the acid containing the acyl radical, for instance, by means of an ester, an amide, an anhydride, an acyl chloride, etc.

Reference has been previously made to the fact that the amino-ether, whether it contains an acyl radical derived from an acid having less than 8 carbon atoms or not, must contain at least one alcoholic hydroxyl radical so that it can combine with a polybasic carboxy acid body. Such alcoholic hydroxyl radical may be present as a residue of the original polyhydric alcohol employed, or the original hydroxyamine employed in the manufacture or formation of the amino-ether. Indeed, it might be possible to subject a polyhydric alcohol or a hydroxyamine to reaction with a polybasic carboxy acid body, and subsequently, cause an etherization reaction to take place. Usually, the most feasible method of obtaining the desired composition of matter which is employed as a demulsifying agent in the present process is to utilize an etherization reaction to obtain the amino-ether and then combine such amino-ether with a polybasic carboxy acid body. It is understood, however, that any particular order may be employed in the actual process or processes of manufacture.

Common polyhydric alcohols include the glycols and glycerols. These polyhydric alcohols are characterized by the ease with which two or more molecules combine with the elimination of water to form polyglycols, polyglycerols, or the like. These compounds are sometimes referred to as ether alcohols, because the typical ether linkage, carbon-oxygen-carbon, appears at least once in such compounds. It is known that certain hydroxyamines, particularly alkanolamines containing alkanol radicals, enter into the same kind of reaction with the formation of a hydroxylated amino ether. Possibly the commonest example of an alkanolamine is an ethanolamine, particularly diethanolamine and triethanalamine. It may be well to point out that the compounds herein contemplated as demulsifying agents are derived from basic compounds, that is, compounds in which the basicity approximates that of the parent hydroxyamine. Such basic amines are characterized by the fact that there is no aryl group directly attached to an amino nitrogen group, unless there be present at least one other amino radical capable of contributing a basic quality. In other words, a hydrogen atom attached to an amino nitrogen atom may remain as such, or may be replaced by an alkyl radical, an alicyclic radical, or an aralkyl radical, or there may be present a hydroxy alkyl radical, a hydroxy alicyclic radical, or a hydroxy aralkyl radical directly attached to the amino nitrogen atom. Furthermore, as has been pointed out previously, such hydroxy hydrocarbon radicals may be acylated with lower aliphatic acids containing at least two carbon atoms and not more than 7 carbon atoms. In the event that an amino nitrogen atom appears in which an aryl radical is directly attached to said amino nitrogen atom, as in the case of phenyl diethanolamine, then the presence of such non-basic amino nitrogen atom must be ignored and the compound must contain at least one amino nitrogen atom of a basic character elsewhere in the molecule. Other suitable aryl alkanolamines, such as diphenyl ethanolamine, naphthyldiethanolamine, phenyldipropanolamine, etc. may be used, subject to the above mentioned provision.

In the following table of compounds, the letter T indicates an amino hydrogen atom, or any one of the substituents which have been suggested as satisfactory to replace an amino hydrogen atom. The following table is submitted purely by way of illustration and indicates only a small portion of the various materials which may be esterified with a polybasic carboxy acid body of the kind hereinafter described, so as to provide demulsifying agents of the kind employed in the present process:

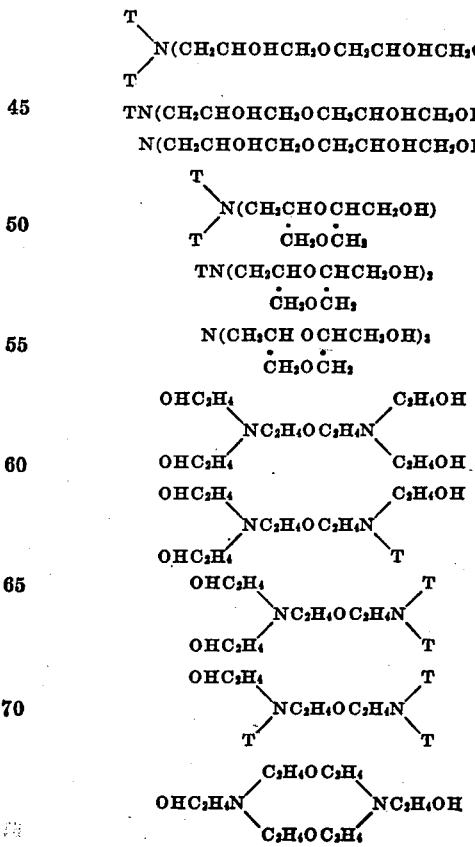
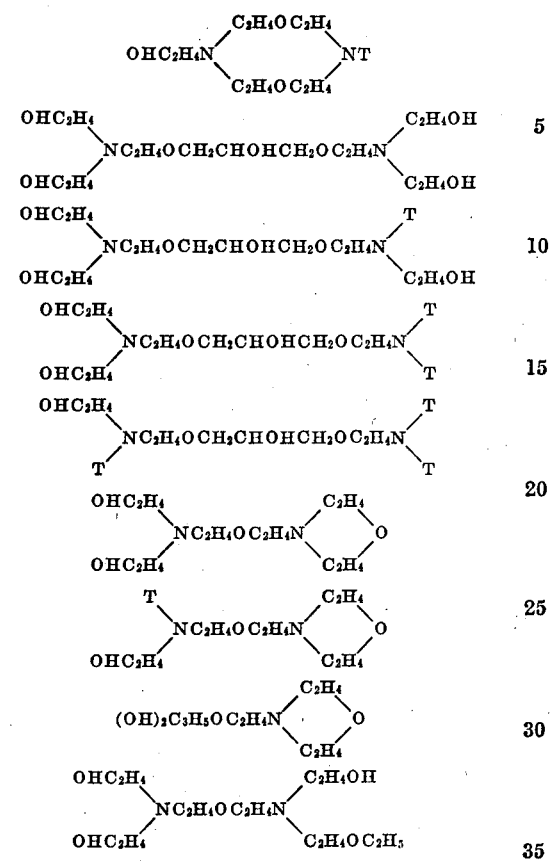

In the above table, it is understood that where the radical $C_2H_4$ occurs, it may be replaced by any other suitable radical, such as a $C_3H_6$, $C_4H_8$ radical, etc. Furthermore, it may be replaced by a residue from a cyclohexyl radical, or a residue from a benzyl radical or the like. Similarly, where the glycerol radical appears, a homolog may be substituted instead, as, for example, beta-methyl glycerol or the tetrahydroxyl derivative thereof. It is unnecessary to differentiate between isomeric forms; and in some instances, one may have polyhydric forms containing a large number of residues derived from polyhydric alcohols or hydroxyamines, and of such a kind that there are present perhaps 20, 30, 40, or even 50 residues from the parent material or materials which contribute to the formation of the final molecule. Continuous etherization is considered as being polymerization, for purposes of convenience. Continuous etherization is intended to refer to molecules in which ether linkages appear more than once, interrupted by other residues or radicals or a combination of the same, and thus form in essence polymers in which substantially the same structural units re-appear linked as indicated by typical ether radicals. In brief, then, they are essentially polymers in which ether linkages are part of the polymeric unit or join the polymeric unit, or serve as the link to combine the polymeric unit. Such polymers may be considered a repetition of the monomer, taken any convenient number of times—for instance, two to twenty times. It is also to be noted that the molecule may be joined by more than one ether linkage in parallel. As previously stated, phenol diethanolamine or similar compounds may enter into the final molecule. Similarly, morpholine or ethanol morpholine may be employed. Morpholine may be considered as contributing the basic amino nitrogen atom. In each and every instance the compound is characterized by having present at least one basic nitrogen atom, i. e., a nitrogen atom unattached to any aryl radical and at least one hydroxylated hydrocarbon radical generally derived from an alkanolamine, or from a glycerylamine, such as monoglycerylamine, diglycerylamine, or triglycerylamine.

As to the manufacture of such compounds, one need only point out that some of them are well known compositions of matter. Others can be produced, if desired, in the same manner employed to produce those which are well known. One method of producing such compounds is to heat the desired products under suitable conditions, so as to cause dehydration to take place. Another method is to treat the selected amine with a product such as an alkylene oxide, including ethylene oxide, or with a product such as glycidol. Other methods involving dehydration in presence of an acidic agent, for instance, dehydration of two moles of diethanolamine, so as to produce the ether type compound instead of morpholine, may be employed. It is possible that some of the types indicated above, like other organic compounds, are difficult to prepare, but their derivatives can be prepared more readily and then employed. In other words, if an acylated product, i. e., containing an acyl radical derived from an acid, is desired, it is feasible, in some instances, to prepare the acylated product by uniting a partially esterified polyhydric alcohol with a partially esterified alkylolamine, or by use of an equivalent method.

Attention is directed to the co-pending application for patent Serial No. 273,278, of Melvin De Groote and Bernhard Keiser, filed May 13, 1939. This particular co-pending application teaches a convenient method for making some of the compounds of the kind previously indicated. The said method involves essentially the conversion of an ethanolamine, or the like, such as triethanolamine, into a mono- or dialcoholate, and the reaction of the alcoholate with a halohydrin, such as glycerol chlorhydrin or glycerol dichlorhydrin. The alcoholates may be indicated by the following formulas:

Such alcoholates react so as to liberate the alkali metal halide, such as sodium choride or potassium chloride. Said co-pending application illustrates, for example, the manufacture of materials of the following type by means of such reaction:

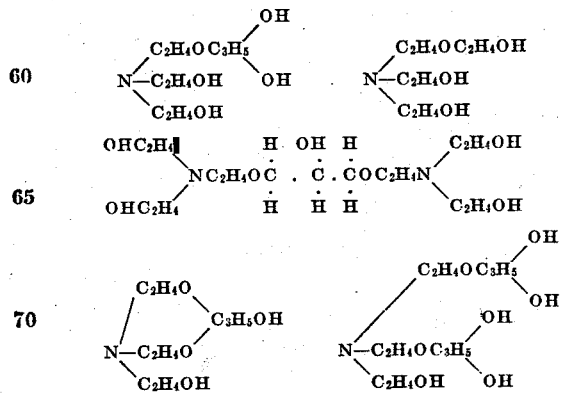

It is to be noted that the chlorhydrin involved may of itself be acylated, and thus compounds are derivable which are characterized by the presence of an acyl radical obtained from acids having either less than 8 carbon atoms or more than 8 carbon atoms. The following excerpt is taken verbatim from said aforementioned application:

"It has been previously pointed out that one may obtain acylated derivatives of the amino ethers by use of the acylated alcoholate derived by utilization of metallic sodium or potassium or the like. In such compounds the acyl radical is attached directly to the tertiary amine residue or radical. However, if one employs an esterified chlorhydrin, i. e., the chlorhydrin derived from monoacetin, monostearin, monoabietin, mononaphthenin, or the like, one obtains a chlorhydrin of the following composition:

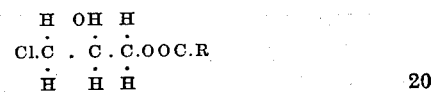

in which R.CO is the acyl radical derived from R.COOH, which represents an acid of the kind previously described. By employing such acylated halohydrin or chlorhydrin, one can use reactants which include reactions of the following type:

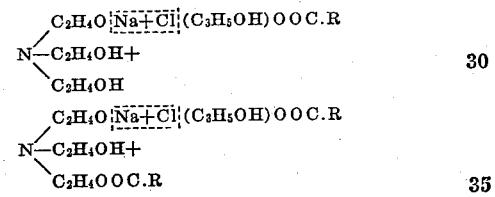

The above reactions can only be conducted in the absence of free alkali."

The following example for preparing a hydroxy amino-ether is taken verbatim from said co-pending application Serial No. 273,278:

"100 pounds of commercial triethanolamine containing 2½% monoethanolamine and 15% diethanolamine, are treated with 133 pounds of a 60% solution of caustic soda (i. e., 80½ lbs. NaOH dissolved in 53 lbs. of water), so as to yield a pasty or semi-solid mass containing substantially no free or relatively little free alkali. The wet mass is then reacted with extreme care, as previously noted, with commercial glycerol monochlorhydrin. After completion of reaction, the sodium chloride formed is separated by filtration and hydraulic pressure. The final product represents a compound of technical purity, and has the following composition:

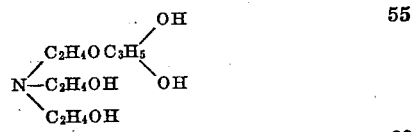

In the hereto appended claims no reference is made to the fact that the alcoholate is employed in substantial absence of alkali, because it is deemed unnecessary to indicate that this condition is the most desirable. The objection to an excess of alkali is the destruction of the chlorhydrin and the formation of a polyhydric alcohol or the like, which appears in the completed product. Naturally, there is no objection to small amounts of excess alkali whose significance is not appreciable. It is to be noted in the claims that no reference is made to separation of the alcoholate from water, excess alkali unreacted amine, etc., which may be present, although, as previously indicated, such separatory procedure may be followed, if desired."

Reference is made to the fact that the table appearing in the earlier part of this application describing a series of representative hydroxy amino-ethers contains certain species containing the ether linkage involving combination with a monohydric alcohol. Such alcohols can vary from methyl through octadecyl or stearyl, and may be normal or branched. In view of this fact, it must be appreciated that the scope of the compounds contemplated as demulsifying agents in the present application may be derived from hydroxyamines and monohydric alcohols, as well as hydroxyamines and dihydric alcohols, or from intermolecular reactions of two or more molecules of hydroxyamines. As to the manufacture of such alkyl ethers of hydroxy alkylamines, it is to be noted that they can be manufactured by means of conventional methods now employed, or by methods which involve modification of previously described methods; or they may be manufactured by the method described in French patent No. 832,288, dated September 23, 1938, to Zschimmer and Schwarz, Chemische Fabrik Dölau.

Reference has already been made to the type of polyhydric alcohol which may be employed. Such polyhydric alcohols include glycerols, polyglycerols, glycols, polyglycols, and various obvious functional equivalents, such as the halohydrins, ether derivatives obtained by combination of a polyhydric alcohol, and a monohydric alcohol, etc. Suitable glycols include ethylene glycol, diethylene glycol, dipropylene glycol, tetraethylene glycol, triethylene glycol, 1,3 butylene glycol, decylene glycol, etc.

Among the various amines which may be employed are the following:

Diethanolamine, monoethanolamine, ethyl ethanolamine, methyl ethanolamine, propanolamine, dipropanolamine, propylpropanolamine; cyclohexanolamine, dicyclohexanolamine, cyclohexylethanolamine, cyclohexyl propanolamine, benzyl ethanolamine, benzyl propanolamine, pentanolamine, hexanolamine, octyl ethanolamine, octadecyl ethanolamine, cyclohexanol ethanolamine; triethanolamine, diethanolalkylamines, such as diethanol ethylamine, diethanol propylamine; diethanol methylamine, tripropanolamine, dipropanol methylamine, cyclohexanol diethanolamine, dicyclohexanol ethanolamine, cyclohexyl diethanolamine, dicyclohexyl ethanolamine, dicyclohexanol ethylamine, benzyl diethanolamine, dibenzyl ethanolamine, benzyl dipropanolamine, tripentanolamine, trihexanolamine, ethyl hexyl ethanolamine, octadecyl diethanolamine, polyethanolamine, mono-, di-, and triglycerylamines, etc.

The demulsifying agent employed in the present process is obtained by esterifying a hydroxy amino-ether of the kind described with a polybasic carboxy acid body of the kind characterized by containing a radical derived from a detergent-forming acid radical. Before enumerating the various polybasic carboxy acids which may be employed, the description may be simplified by reference to various common examples. The detergent-forming acids which we prefer to employ are the fatty acids, such as oleic acid, stearic acid, hydroxystearic acid, erucic acid, ricinoleic acid, oxidized derivatives thereof, linolic acid, linolenic acid, etc. As has been previously pointed out, one may employ non-fatty detergent-forming acids, such as abietic acid, hydrogenated abietic acid, naphthenic acid, chlornaphthenic acid, etc. The modified detergent-forming acids may be employed with the same effectiveness as the unmodified acids, provided that the modification does not detract from the compound, its property of combining with alkali to produce soap or soap-like materials. For the sake of brevity, examples will be concerned mostly with derivatives of fatty acids.

It is well known, of course, that phthalic anhydride, for example, can combine directly with fatty acids, such as ricinoleic acid, hydroxystearic acid, dihydroxystearic acid, blown oleic acid, and the like, to form acid phthalates which are nothing more or less than fractional esters characterized by the presence of a detergent-forming acid radical, which, in the above enumerated instance, happens to be a fatty acid radical. Naturally similar phthalated derivatives, are obtainable from glycerides, such as triricinolein, trihydroxy stearin, etc. The method of manufacturing these products is the conventional esterification process, and is well known, because it can be used extensively in the manufacture of demulsifiers, plasticizers, and the like. For a more complete list and description of this type of compound, reference is made to the examples and structural formulas which are found in co-pending application for patent Serial No. 211,036, of Melvin De Groote, filed May 31, 1938, which resulted in U. S. Patent No. 2,166,431, dated July 18, 1939.

A second class of materials which may be employed is the class characterized by having an alcohol hydroxyl remaining as part of the residue which replaces the carboxylic hydrogen atom of the detergent-forming acid. Reference is made to such materials as mono-olein, diolein, monostearin, distearin, mono-abietin, diabietin, mononaphthenin, dinaphthenin, diricinolein, etc. As to those materials which are derived from fats, it is only necessary to point out that they have been sold under the name of superglycerinated fats, although they need not necessarily be derived from glycerides or from glycerine. They may be derived, obviously, from glycols. Such materials are used as demulsifying agents, both in edible and non-edible products. They are derived from a wide variety of acids, and a wide variety of polyhydric alcohols of both the ether and non-ether type; i. e., they are derived from the polyglycerols, as well as the glycerols and from the polyglycols, as well as the glycols. As to a more complete description of these types of compounds, as well as structural formulas of the same, reference is made to the co-pending application for patent Serial No. 211,038, of Melvin De Groote, filed May 31, 1938, which subsequently resulted in U. S. Patent No. 2,166,433, dated July 18, 1939. Superglycerinated fats may be derived from naturally-occurring glycerides, such as castor oil, olive oil, cottonseed oil, rapeseed oil, fish oil, menhaden oil, corn oil, cocoanut oil, teaseed oil, neat's-foot oil, linseed oil, etc. Similarly, such blown oils may be used.

A large number of polybasic acids or polybasic acid compounds are known which are suitable for the preparation of reagents of the kind described. Some of these polybasic acids contain at least three carboxyl radicals. Among others, they include phthalic acid, succinic acid, maleic acid, fumaric acid, citric acid, malic acid, adipic acid, tartaric acid, glutaric acid, diphenic acid, naphthalic acid, oxalic acid, etc.

As has been stated previously, esterification between hydroxylated detergent-forming acid bodies, such as triricinolein ethyl ricinoleate, monoabietin, diolein, mononaphthenin, or the like, takes place readily with the application of heat and the elimination of any water which may be formed. One may employ a fairly high temperature to hasten the reaction, provided that decomposition does not take place; or the reaction may be conducted in the presence of an inert solvent, such as xylene, which may be removed after completion of the reaction. The reaction can be hastened also by passing through the mixture a dried, inert gas; or the reaction may be conducted with a reflux condenser, using material such as xylene, and a water trap to remove water as quickly as formed. Generally speaking, however, the reactions take place rapidly and completely by simply heating the products together in stoichiometrical proportions, by keeping the temperature somewhat above the boiling point of water, and particularly between 100–110° C., provided there is no decomposition. Phthalic anhydride is particularly suitable, because it does not decompose readily; whereas, some other acid, such as oxalic acid, may be equally desirable, but the temperature of esterification must be lowered, in order to avoid decomposition.

It is to be noted that the manufacture of the demulsifying agent really involves three steps, one consisting of etherification, and two consisting of esterification. For example, one may obtain an ether from triethanolamine and glycerol, preferably employing the sodium alcoholate, and chlorhydrin reaction. Having completed the etherification, one then obtains a product by esterification of a selected detergent-forming acid body, such as triricinolein (castor oil), and a selected polybasic carboxy acid, such as phthalic anhydride. Having obtained such fractional ester characterized by the presence of at least one free carboxyl radical, one then employs such fractional ester for a second esterification process involving the hydroxylated amino-ether previously described.

Needless to say, if one desired, the hydroxylated amino-ether characterized by the presence of free hydroxy radicals could be esterified with phthalic anhydride to yield a fractional ester, containing carboxyl radicals. Such acidic fractional ester, so obtained, could then be combined by further esterification with the selected hydroxylated detergent-forming acid body, such as castor oil or mono-olein. It is understood that it is immaterial what procedure is employed to produce the demulsifying agent employed in the present process, and such demulsifying agent may be obtained in the manner indicated, or may be obtained by the same manufacturing operations employed in some order other than that indicated. Furthermore, such compounds may be obtained by entirely different types of reactions, and need not involve the indicated procedure. It is necessary that the reaction be controlled so that no acyl radical derived from a detergent-forming acid has an opportunity to esterify with any of the hydroxyl radicals attached to the hydroxylated amino-ether. One may, of course, have hydroxyl radicals attached to the amino-ether which remain uncombined after reaction with the polybasic carboxy acid compound. Similarly, any carboxyl radicals which are present after reaction with the polybasic carboxy acid compound may be permitted to remain as such, or may be neutralized in the conventional manner with the base, such as caustic soda, caustic potash, ammonia, calcium oxide, ethanolamine, diethanolamine, triethanolamine, cyclohexylamine, benzylamine, etc., or may be replaced by a residue derived from an alcoholic radical, including monohydric alcohols, polyhydric alcohols, amino alcohols, and the like. For instance, if citric acid is employed, obviously, one carboxyl radical might be utilized to combine with the hydroxy amino-ether, and one carboxyl radical to unite with the hydroxylated detergent-forming acid compound; and the remaining carboxyl radical could be esterified with an alcohol, such as ethyl alcohol, ethylene glycol, glycerol, triethanolamine, or could be neutralized with a suitable base, including the various amines, or, if desired, could remain without change.

Our preferred material is obtained in the following manner:

We employ the previously described method to obtain 100 pounds of the compound prepared from commercial triethanolamine, caustic soda, and glycerol monochlorhydrin of the following composition:

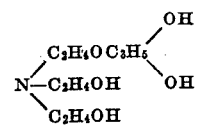

As a separate step, we react castor oil with phthalic anhydride, so as to obtain a mixture of the diphthalated and triphthalated product of the kind in which there is one free carboxyl for each carboxyl combined with the fatty material. The method of making such a product and similar products, is described in detail in U. S. Patent No. 1,976,602, dated October 9, 1934, to De Groote, Adams and Keiser. Having obtained the two products previously indicated, we mix the same in molecular proportions, and heat it approximately at 130–180° until the esterification process has eliminated approximately half of the alcoholic hydroxyl radicals present. The product so obtained is diluted with any suitable solvent, or employed as such.

We have found it desirable, however, to employ the types of material in which there are present a relatively large number of hydroxyl radicals, and to esterify only part of such hydroxyl radicals. Thus, the amino-ether of the kind described may be considered, for the sake of simplicity, as being in the class of an alcohol, i. e., a monohydric or polyhydric alcohol. If an alcohol is indicated by the formula $Y'(OH)_n$, where $n$ indicates the number one or more, and if a polybasic acid be indicated by the formula $X'(COOH)_n$, where $n$ indicates the number 2 or more, then the reactions between a monohydric alcohol and a polybasic acid will result in a compound which may be indicated by the following formula: $YX(COOH)_n$, where $n$ indicates the number one or more, and which is, in reality, a contraction or degradation of a more elaborate structural formula, in which $X'$ and $Y'$ are joined by a carboxyl radical or residue. Assuming, however, as would be true in the majority of cases, that the alcohol actually would be a polyhydric alcohol, then examination reveals that the formula might result in a combination, in which there were neither residual carboxyl radicals, nor residual hydroxyl radicals, or might result in compounds in which there were residual hydroxyl radicals and no residual carboxyl radicals, or compounds where there might be residual carboxyl radicals and no residual hydroxyl radicals; or there might be both. This is indicated by the following:

$$(Y.X)_q(OH)_{n'}$$
$$(Y.X)_q(COOH)_{m'}$$
$$(OH)_{n''}(YX)_q(COOH)_{m''}$$

in which $q$ indicates a small whole number (one in the case of a monomer and probably not over 20, and usually less than 10), and $m'$ and $n'$ indicate the number one or more, and $m''$ and $n''$ indicate a small or moderately sized whole number, such as 0, 1 or more, but in any event, probably a number not in excess of 40; for instance, as would be indicated by a molecule which involved 10 to 15, or perhaps 20 moles of the acylated amino-ether of the kind previously described. Naturally, each residual hydroxyl could be combined with phthalic anhydride, so as to give at least one free carboxyl; or, if combined with a tribasic acid, such as citric acid, the number of free carboxyls might approach several hundred; for instance, 400 or 500 at least. Actually, the preferable type of reagent would be more apt to contain less than 20, and in fact, less than 10 free hydroxyl radicals. As has been stated previously, the residual carboxyl radicals can be permitted to remain as such, or can be neutralized in any suitable manner, such as conversion into salts, esters, amides, amino esters, or any other suitable form.

For practical purposes, however, we have found that the most desirable products are obtained by combinations, in which the ratio of the amino-ether to the polybasic acid body is within the ratio of three to one and one to five, and in which the molecular weight of the resultant product does not exceed 10,000, and is usually less than 5,000, or perhaps less than 3,000. This is particularly true if the resultant product is soluble to a fairly definite extent, for instance, at least 5%, in some solvent, such as water, alcohol, benzene, dichlorethyl ether, acetone, cresylic acid, or the like. This is simply another way of stating that it is preferable that the product be of the sub-resinous type, which is commonly referred to as an A resin or a B resin, as distinguished from a C resin, which is a highly infusible, insoluble resin (see Ellis, Chemistry of Synthetic Resins (1935), pages 862, et seq.).

In recapitulating what has been said previously, the sub-resinous, semi-resinous, or resinous product herein contemplated may be indicated by the following formula:

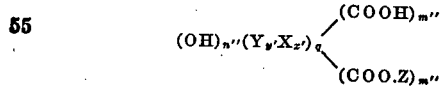

in which the characters have their previous significance, and $y'$ represents a small whole number not greater than 3, and $x'$ represents a small whole number not greater than 5; Z represents a hydrogen ion equivalent, such as a metallic atom, organic radical, etc.

One must not lose sight of the fact that the product herein contemplated is a basic amine. This means, of course, that the product can combine with acids to form salts; for instance, it may combine with acetic acid, hydrochloric acid, oxalic acid, phthalic acid, butyric acid, naphthenic acid, etc. To state the matter another way, the herein contemplated amine, if desired, may be dissolved in a dilute acid, such as 5% of acetic acid, 5% sulfuric acid, 5% nitric acid, or the like. The amine may be used as such, or as an aqueous solution, which, in essence, represents the corresponding ammonium or diammonium base. In other words, all references herein to the final product, and particularly in the appended claims, contemplate not only the amine itself, but the corresponding salts or double salts, the corresponding base or double base, the corresponding salt base mixture, or similar variations, which may be indicated from this viewpoint solely by the following monomeric type formulas:

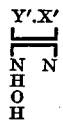

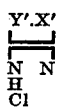

As is obvious, no effort is made to differentiate between isomeric forms, one form being as suitable as another. Attention has already been directed to the fact that obvious chemical equivalents may be employed, and that the product may be manufactured in any way desired; for instance, one may employ the procedure herein described, or may employ other procedures. Furthermore, in adopting the procedure here employed, one may use the successive steps, as indicated, or one may use the same operating steps in some other order.

Reference has been made to the fact that there may remain uncombined hydroxyl radicals attached to the amino-ether residue. If desired, any or all of such residual hydroxyl radicals may be eliminated by combination with a monohydric alcohol, so as to form an ether, or by reaction with a monobasic carboxy acid containing less than 8 carbon atoms, as previously described, or by reaction with any suitable polybasic acid, for instance, phthalic acid, oxalic acid, etc., including all the herein enumerated polybasic carboxy acids. The carboxyl radicals thus present may remain as such, or may be eliminated in the manner described above. In some instances, after the hydroxylated amino-ether has been esterified with a product such as diphthalated ricinolein, and in such a manner as to permit residual hydroxyl radicals to remain, it may be desirable to add more phthalic anhydride and esterify further so as to produce a product more suitable for demulsification of the particular emulsion in question.

Reference has been made to the fact that the amino-ether employed shall be free from acyl radicals obtained from acids containing 8 or more carbon atoms, such as the various detergent-forming acids which have been described. It has been pointed out that such acids can obviously be combined with such hydroxy amino-ethers by simple esterification, i. e., by acylation, in the same manner that similar acids or acid compounds having fewer carbon atoms, for instance, acetic or heptoic acid, might be combined with such hydroxy amino-ethers. It is immaterial whether such derivatives be considered as acylation derivatives or esterification derivatives, the difference being purely a matter of nomenclature. It is intended that the esterification products herein contemplated as the demulsifying agents shall be free from the oxy-acyl radical derived from detergent-forming acids having more than 7 carbon atoms directly attached to the amino-ether radical. However, in the strictest sense, it is not necessary that they be free from such acyl radicals, as differentiated from such oxy-acyl radicals. In other words, it is possible that a detergent-forming acid could combine with an amine in such a manner to form an amide, in which the acyl radical R.CO is directly attached to the amino nitrogen atom, but the compound itself would still be free from any oxy-acyl radical derived from a detergent-forming acid. To put it another way, it would be free from the radical R.COO. Therefore, in the hereto appended claims the compound is described as being free from any oxy-acyl radical, and in such instances where it is intended to exclude acyl radicals in amide form, the product is referred to as non-amido, or by means of other suitable language.

In the hereto attached claims reference to the number of carbon atoms in the amino-ether radical contemplates the radical as such, without reference to any attached acyl or oxy-acyl radicals.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone or in combination with other demulsifying procedure, such as the electrical dehydration process.

Attention is directed to our two co-pending applications Serial Nos. 284,378 and 284,379, and filed July 13, 1939, which disclose related demulsifying agents.

Having thus described our invention, what we claim as new and desire to secure by Letters Patent is:

1. A process for breaking petroleum emulsions of the water-in-oil type, characterized by subjecting the emulsion to the action of a demulsifying agent, comprising an esterification product of the kind derivable by reaction between: (A) a polybasic carboxy acid body, characterized by containing at least one detergent-forming acid radical and at least one carboxy radical; and (B) a basic hydroxy amino-ether of the kind containing at least one amino nitrogen free from attached aryl and amido-linked acyl radicals; said hydroxy amino-ether radical being further characterized by the presence of at least one radical derived from a basic hydroxyamine and being attached by at least one ether linkage to at least one radical selected from the class consisting of glycerol radicals, polyglycerol radicals, polyglycol radicals, basic hydroxyamine radicals, amido hydroxyamine radicals, and aryl alkanolamine radicals; said basic hydroxy amino-ether radical being characterized by containing not over 60 carbon atoms; said amino-ether being free from any oxy-acyl radicals derived from acids having more than 7 carbon atoms; and said esterification product being characterized by at least one ester linkage involving an alcoholiform hydroxyl of the aforementioned hydroxy amino-ether and at least one carboxyl radical directly attached to the polybasic carboxy acid residue.

2. A process for breaking petroleum emulsions of the water-in-oil type, characterized by subjecting the emulsion to the action of a demulsifying agent, comprising an esterification product of the kind derivable by reaction between: (A) a polybasic carboxy acid body, characterized by containing at least one detergent-forming acid radical and at least one carboxyl radical; and (B) a basic hydroxy amino-ether of the kind containing at least one amino nitrogen free from attached aryl and amido-linked acyl radicals; said hydroxy amino-ether radical being further characterized by the presence of at least one radical derived from a basic hydroxyamine and being attached by at least one ether linkage to at least one glycerol radical; said basic hydroxy amino-ether radical being characterized by containing not over 60 carbon atoms; said amino-ether being free from any oxy-acyl radicals derived from acids having more than 7 carbon atoms; and said esterification product being characterized by at least one ester linkage involving an alcoholiform hydroxyl of the aforementioned hydroxy amino-ether and at least one carboxyl radical directly attached to the polybasic carboxy acid residue.

3. A process for breaking petroleum emulsions of the water-in-oil type, characterized by subjecting the emulsion to the action of a demulsifying agent, comprising an esterification product of the kind derivable by reaction between: (A) a polybasic carboxy acid body, characterized by containing at least one detergent-forming acid radical and at least one carboxyl radical; and (B) a basic hydroxy amino-ether of the kind containing at least one amino nitrogen free from attached aryl and amido-linked acyl radicals; said hydroxy amino-ether radical being further characterized by the presence of at least one radical derived from a basic hydroxyamine and being attached by at least one ether linkage to at least one polyglycerol radical; said basic hydroxy amino-ether radical being characterized by containing not over 60 carbon atoms; said amino-ether being free from any oxy-acyl radicals derived from acids having more than 7 carbon atoms; and said esterification product being characterized by at least one ester linkage involving an alcoholiform hydroxyl of the aforementioned hydroxy amino-ether and at least one carboxyl radical directly attached to the polybasic carboxy acid residue.

4. A process for breaking petroleum emulsions of the water-in-oil type, characterized by subjecting the emulsion to the action of a demulsifying agent, comprising an esterification product of the kind derivable by reaction between: (A) a polybasic carboxy acid body, characterized by containing at least one detergent-forming acid radical and at least one carboxyl radical; and (B) a basic hydroxy amino-ether of the kind containing at least one amino nitrogen free from attached aryl and amido-linked acyl radicals; said hydroxy amino-ether radical being further characterized by the presence of at least one radical derived from a basic hydroxyamine and being attached by at least one ether linkage to at least one basic hydroxy amine radical; said basic hydroxy amino-ether radical being characterized by containing not over 60 carbon atoms; said amino-ether being free from any oxy-acyl radicals derived from acids having more than 7 carbon atoms; and said esterification product being characterized by at least one ester linkage involving an alcoholiform hydroxyl of the aforementioned hydroxy amino-ether and at least one carboxyl radical directly attached to the polybasic carboxy acid residue.

MELVIN DE GROOTE.
BERNHARD KEISER.
CHARLES M. BLAIR, Jr.